(12) United States Patent
Waddell (10) Patent No.: US 12,146,305 B2
(45) Date of Patent: Nov. 19, 2024

(54) SMART MULTIPURPOSE FOUNTAIN FAUCET

(71) Applicant: Nasoni, LLC, Suffolk, VA (US)

(72) Inventor: John Steven Waddell, Suffolk, VA (US)

(73) Assignee: Nasoni, LLC

( * ) Notice: Subject to any disclaimer, the term of this patent is extended or adjusted under 35 U.S.C. 154(b) by 123 days.

(21) Appl. No.: 17/692,585

(22) Filed: Mar. 11, 2022

(65) Prior Publication Data

US 2022/0298763 A1 Sep. 22, 2022

Related U.S. Application Data

(60) Provisional application No. 63/161,508, filed on Mar. 16, 2021.

(51) Int. Cl.
*E03C 1/04* (2006.01)
*E03C 1/05* (2006.01)
*G05B 13/02* (2006.01)

(52) U.S. Cl.
CPC .......... *E03C 1/0405* (2013.01); *E03C 1/057* (2013.01); *G05B 13/0265* (2013.01)

(58) Field of Classification Search
CPC ...... E03C 1/0405; E03C 1/057; E03C 1/0404; E03C 1/16; E03C 2001/0414; E03B 9/20; G05B 13/0265
See application file for complete search history.

(56) References Cited

U.S. PATENT DOCUMENTS

| | | | |
|---|---|---|---|
| 7,753,075 B2 * | 7/2010 | Lin | E03C 1/0404 137/625.46 |
| 8,572,772 B2 * | 11/2013 | Wolf | E03C 1/057 4/678 |
| 8,616,229 B2 * | 12/2013 | Jacoway | F16K 27/12 137/382.5 |
| 2020/0181894 A1 * | 6/2020 | Chung | A47K 3/281 |
| 2020/0385963 A1 * | 12/2020 | Song | E03C 1/0404 |

* cited by examiner

*Primary Examiner* — Janie M Loeppke
(74) *Attorney, Agent, or Firm* — Syam Anand (57) ABSTRACT

Faucet assemblies and associated methods are disclosed. A disclosed faucet assembly comprises a faucet having at least two different water outlets, at least one sensor, and a processor. The processor is configured to receive a signal from the at least one sensor, determine a faucet configuration for the faucet based on the signal, and allow water to flow from a water source to one of the at least two different water outlets based on the faucet configuration.

18 Claims, 6 Drawing Sheets

SMART MULTIPURPOSE FOUNTAIN FAUCET

CROSS REFERENCE TO RELATED APPLICATIONS

This application claims the benefit of U.S. Provisional Patent Application No. 63/161,508 filed Mar. 16, 2021, which is incorporated by reference herein in its entirety for all purposes.

BACKGROUND

New incidence of spinal cord injuries (SCI) ranges from 250 k to 500 k globally each year, with up to 7 million people impacted worldwide. Currently almost 300 k individuals are living in the United States with SCI and approximately 60% of those are considered quadriplegic. Spinal cord injury results in life-altering consequences in terms of morbidity, mortality, functional status, employment, and quality of life. Beyond physical and mental impact on the individual, the economic and social impacts are extreme with average lifetime cost of care for a young adult at age 25 with high quadriplegia estimated to be $4.6 million. The range of functional impact most often depends on the level of injury and completeness. Higher level, more complete injuries cause more widespread weakness and paralysis. For quadriplegics with injuries at the cervical level, their ability to complete even the most basic Activities of Daily Living (ADLs) are severely compromised, as they may only retain head control as well as some slight shoulder control, elbow flexion, and tenodesis grasp of objects. One of the most basic human needs is accessibility to water for wide ranging ADLs such as drinking, grooming, eyewash, or face washing. However, control and delivery form factor of the water (e.g., On/Off, temperature, force, angle, and stream/spray type) have different requirements for unique ADLs. Traditional faucets can be very challenging, if not impossible, for an individual with high level SCI and limited control degrees of freedom to adjust and control for a given task requiring water. Furthermore, many people, including those with advanced arthritis, Parkinson's, and other similar issues have difficulty operating traditional faucets.

SUMMARY

This disclosure relates generally to smart multipurpose faucets and more specifically to faucet assemblies that can be used for various purposes and controlled by an individual via gestures and/or other inputs, even if the individual presents a physical disability that interferes with their ability to use the faucet in a conventional manner.

Specific embodiments of the invention refer to a sensor driven smart faucet to enable and empower independent drinking and grooming for individuals, for example individuals impacted by spinal cord injury. Spinal cord injury severely impacts functional access to water, which is a key to increased independence and successful completion of activities of daily living (ADL). Therefore, commercialization of smart faucets, which can automatically deliver water in target temperature, force, and nozzle setting for a specific ADL, have the potential to empower individuals with SCI for greater independence and improved quality of life.

The smart faucet of specific embodiments of the invention can solve these market challenges by smart sensor integration, automated flow adjustment, and intuitive control algorithms to improve water accessibility for targeted ADLs in SCI. The smart faucet design can deliver water through more than one outlet, such as a traditional downward spout or upward fountain delivery, allowing a single faucet to be used by multiple users in a single household and for a variety of ADLs. System design can integrate a sensor network (for example proximity, voice, camera, eye gaze sensor, etc.) which can be calibrated based on remaining control degrees of freedom of the individual. Intelligent algorithm mapping can allow the user to activate the faucet for use and adjust it through various flow control features such as on/off, temperature, nozzle (spray or stream), force, and angle of water flow for a given task. For example, the faucet can be configured to automatically adjust to warm, spray, and higher delivery angle for face washing, as opposed to cold, stream, and lower delivery angle for drinking water.

In specific embodiments of the invention, a faucet assembly is provided. The faucet assembly comprises a faucet having at least two different water outlets, at least one sensor, and a processor. The processor is configured to receive a signal from the at least one sensor, determine a faucet configuration for the faucet based on the signal, and allow water to flow from a water source to one of the at least two different water outlets based on the faucet configuration.

In specific embodiments of the invention, a method of configuring a faucet is provided, the faucet having at least two different water outlets. The method comprises receiving a signal from at least one sensor, determining a faucet configuration for the faucet based on the signal, and allowing water to flow from a water source to one of the at least two different water outlets based on the faucet configuration.

In specific embodiments of the invention, a processing module for a faucet is provided, the faucet having at least two different water outlets. The processing module is configured to receive a signal from at least one sensor, determine a faucet configuration for the faucet based on the signal, and allow water to flow from a water source to one of the at least two different water outlets based on the faucet configuration.

BRIEF DESCRIPTION OF THE DRAWINGS

In the Figures, like reference numbers correspond to like components unless otherwise stated.

DETAILED DESCRIPTION

Reference will now be made in detail to implementations and embodiments of various aspects and variations of devices, systems and methods described herein. Although several exemplary variations of the devices, systems and methods are described herein, other variations of the devices, systems and methods may include aspects of the devices, systems and methods described herein combined in any suitable manner having combinations of all or some of the aspects described.

Different components and methods for a faucet such as faucet 100 illustrated in FIG. 1 will be described in detail in this disclosure. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

Figure 1:
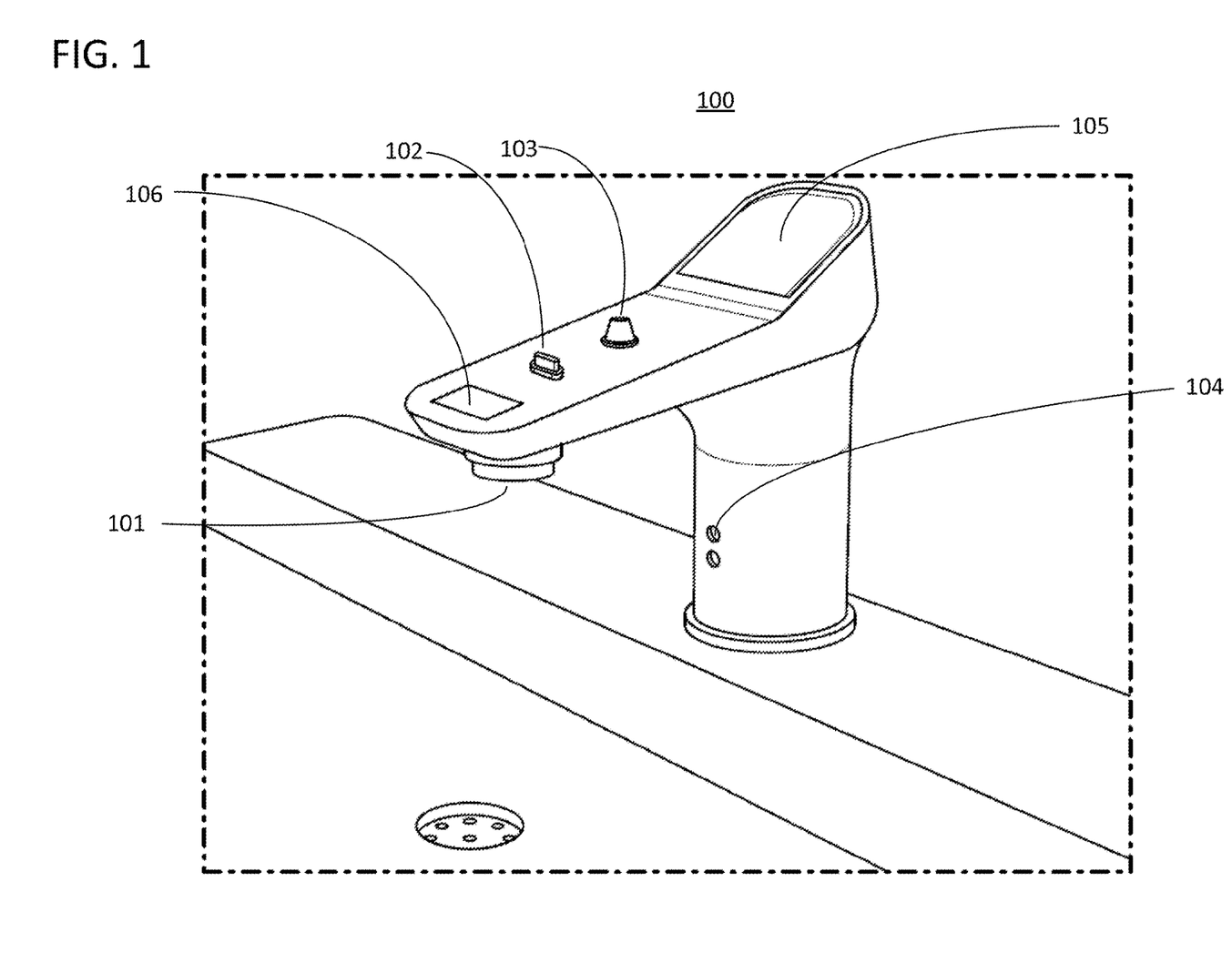
FIG. 1 illustrates an example of a faucet, in accordance with specific embodiments of the invention disclosed herein.

FIG. 1 illustrates an example of a faucet 100 in accordance with specific embodiments of the invention. In specific embodiment of the invention, the faucet can include a set of at least two different water outlets. In the example of FIG. 1, faucet 100 includes a set of three different water outlets 101, 102 and 103. Each of the water outlets in the set of water outlets can have different characteristics and serve different purposes. In the example of FIG. 1, outlet 101 can be a standard downward faucet flow outlet, for example in the form of a spout for a standard faucet flow. Outlet 103 can be a fountain flow outlet, for example to obtain water for drinking or otherwise provide an upward water flow towards a user's mouth/face (e.g., to rinse the mouth). Outlet 102 can be any other kind of outlet, such as a spray outlet, for example to obtain water for damping and/or washing the face (e.g., to rinse facial cleanser or shaving cream from left and/or right cheeks).

The water outlets illustrated in the example of FIG. 1 are non-limiting examples of the various water outlets in the set of water outlets that a faucet in accordance with specific embodiments of the invention could include. Various outlets that serve various purposes can be included in the faucet and used in accordance with the present invention. Generally speaking, a standard downward faucet flow outlet for general uses such as washing hands and at least one other water outlet for another purpose can be included in the faucet, in accordance with specific embodiments of the invention. The different outlets can be used for the same purposes but have different characteristics that facilitate different uses. For example, an upward flow via an upper outlet such as outlets 102 and 103 can be more convenient for drinking water and washing the face than a downward flow via a downward outlet such as outlet 101. Although outlet 101 can serve any purpose, drinking water and/or washing the face could require the user to bend to an uncomfortable position or using their hands to collect water, while the upward flow can be configured to provide water in a more convenient flow for these actions. In the case of individual with physical disabilities, drinking water or showing their faces using a standard downward water flow may be even impossible. In specific embodiments of the invention, outlets 102 and 103, for example through the use of flow regulators (restrictors) which may range from 0.2 gpm to 0.5 gpm, can also simultaneously be used to save water when compared to the normal flow rates of household bathroom faucets for outlet 101, which typically range from 1.2 gpm for California Energy Commission (CEC) faucets, to 1.5 gpm for WaterSense faucets, and 2.2 gpm for standard bathroom faucets.

In specific embodiment of the invention, the faucet can include one or more sensors. The sensor can be any kind of sensor configured to sense activity around the faucet. For example, the sensors can be proximity sensors, facial landmark sensors/detectors (e.g., to identify mouth, eyebrows, nose, and/or any facial landmark), motion sensors (e.g., to sense head movement and/or eye movement and/or detect a particular gesture, such as "yes" or "no" head movements), eye tracking sensors such as eye gaze sensors, image sensors, light sensors, touch or tactile sensors, cameras, voice recognition sensors, etc. The faucet can also include sensors that sense other parameters (e.g., operational or physical parameters) such as temperature sensors, flow sensors, pressure sensors, etc. In the example of FIG. 1, faucet 100 includes a proximity sensor 104 and an eye gaze sensor 105, so that the faucet can be configured to sense a user's presence (e.g., via proximity sensor 104) and a user's intended action (e.g., via eye gaze sensor 105). If one's mouth is open, for example, facial recognition technology could recognize the user needs a drink of water and the faucet could initiate a water fountain. Conversely, approaching the faucet with mouth closed could indicate a need for a facial rinse, and the faucet could initiate a facial spray.

In specific embodiments of the invention, the faucet can include or otherwise work in association with means for interacting with a user, such as means for receiving information from, and means for providing information to, a user. The means for interacting with a user can be or include the one or more sensors described in this disclosure. The term "sensor", as will be used in this disclosure, can also include any of the means for receiving information from the user described herein (e.g., a microphone, a touch display, etc.). The means for interacting with a user can include any means that facilitate a user interaction with a faucet, such as a microphone, a speaker, a display, buttons, etc. The means for interacting with a user can be embedded in the faucet itself, be part of a faucet assembly, or be individual devices that can work in association with the faucet. For example, the faucet can work in association with a user device, such as smart phone, and the means for interacting with the user can be in the user device itself (e.g., the phone's screen, microphone and speakers). As another example, the faucet can include or otherwise be associated to a speaker for providing auditory cues. The faucet can include a speaker or be able to connect to a speaker such as a smart speaker or Bluetooth speaker of the user's preference. In this way, the faucet can be configured to issue auditory cues (e.g., audio instructions, alarms, beeps, etc.) to facilitate user's interaction. As another example, the faucet can include or otherwise be associated to a display, for providing information to the user. The display can be a touch screen display so that the user can interact back with the faucet via the same display. For example, faucet 100 includes a display 106 to provide a temperature readout to the user to alert them to the temperature of the water that is currently being dispensed from faucet 100 for a given task, such as facial rinse.

The faucet can include or otherwise work in association with one or more processors configured to receive signals form the one or more sensors described above (e.g., sensors 104 and 105 in the example of FIG. 1) and receive/transmit information from/to the one or more means for interacting with the user. The sensors can be configured to sense the physical phenomenon they are designed to sense (e.g., presence, eye movement, voice command, etc.) and provide an associated output signal to the processor(s). Similarly, the various means for interacting with a user can be configured to receive a user interaction (e.g., voice command, screen selection, etc.) and provide associated output signals to the processor(s).

In specific embodiments of the invention, and as will be described below in more detail, the processor(s) can be configured to use the sensors signals for various purposes. The processors can use the sensors signals to train an algorithm that matches the signal to a desired configuration for the faucet (e.g., which water outlet to use given the received signal). As another example, the processor(s) can use the signals to determine a faucet configuration for the faucet based on the signal and/or to allow water to flow from a water source to one of the water outlets based on the faucet configuration.

Figure 2:
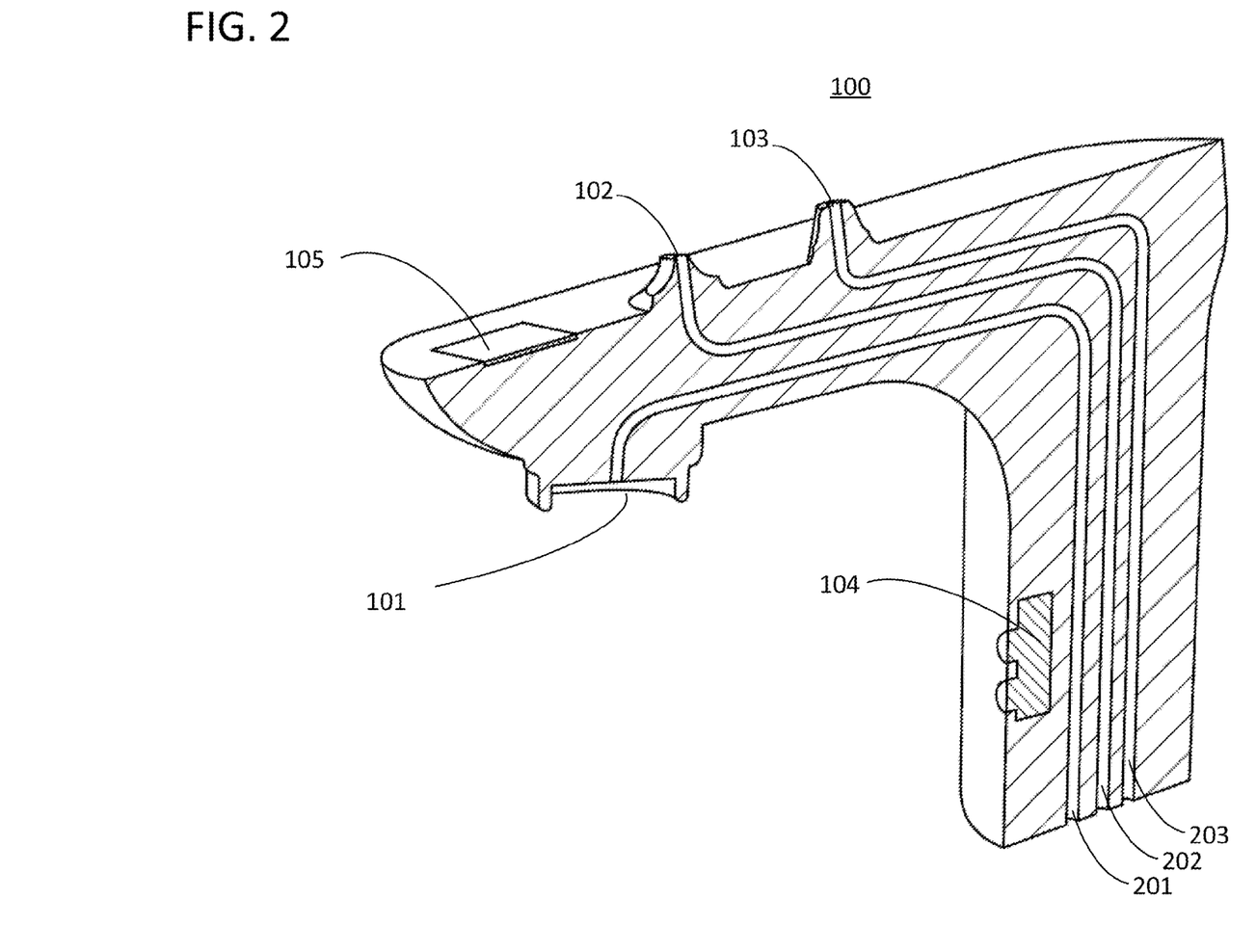
FIG. 2 illustrates a sectional view of a faucet, in accordance with specific embodiments of the invention disclosed herein.

FIG. 2 illustrates a sectional view of a faucet, such as faucet 100 introduced with reference to FIG. 1. As illustrated, the faucet can include one or more internal conduits or channels (e.g., conduits 201, 202 and 203). The conduits can be for conveying water form a water source (e.g., water supply pipe, water tank, etc.) to the different water outlets in the faucet. In the example illustrated in FIG. 2, each water outlet corresponds to an individual water conduit inside the faucet (conduit 201 leads to outlet 101, conduit 202 leads to outlet 102, and conduit 203 leads to outlet 103). The three conduits can be fed via a common water source (e.g., water supply pipe, water reservoir from which temperature is adjusted depending on the task, etc.) or individual water sources (e.g., a warm water reservoir for outlet 101 to wash the hands and a cold-water reservoir for outlet 103 for drinking water).

In specific embodiments of the invention, the faucet can be configured to operate in various faucet configurations. The faucet configurations can define how the faucet will operate in different instances, for example, for different users, for different uses or tasks, and/or for any other factor that could influence how the faucet is configured, such as the weather, time of the day, etc. In specific embodiments of the invention, the faucet configurations can define parameters such as a water temperature, type of flow (e.g., angle, water pressure, water volume per unit of time, and the like), time during which water should be dispensed, so that, for a given configuration, the faucet is able to provide water with given preset characteristics.

In specific embodiment of the invention, the faucet configuration can define an outlet in the set of different water outlets (e.g., outlets 101, 102 and 103 in the example of FIG. 1) to which water can be allowed to flow from a water source. For example, a faucet configuration can be for allowing water to flow via conduit 201 towards outlet 101 while preventing water to flow via conduits 202 and 203 towards outlets 102 and 103, respectively. Another configuration can be for allowing water to flow via conduit 202 towards outlet 102 while preventing water to flow via conduits 201 and 203 towards outlets 101 and 103, respectively. Another configuration can be for allowing water to flow via conduit 203 towards outlet 103 while preventing water to flow via conduits 201 and 202 towards outlets 101 and 102, respectively. Any combination of the above can also define a configuration for the faucet, for example the faucet can be configured to allow water to flow via more than one conduit and therefore towards more than one outlet at a time. In any case, the faucet configuration can indicate which conduit to block/unblock for water to flow through, and therefore, which outlet to use to provide water through. This could depend, for example, on a task to be performed, so that if the user desires to drink water the faucet configuration can define that water be directed to the water fountain outlet (e.g., 102, 103) and not the downward flow outlet (e.g., 101).

Conventionally, a bathroom faucet includes a hot and cold-water knob used to control flow of water through the faucet, which can be utilized for hand washing, face washing, rinsing after brushing, etc. However, existing faucets may be inconvenient to use for purposes other than conventional hand washing, unhygienic, and result in wasting large amounts of water. Furthermore, for users with certain physical disabilities, it may be almost impossible to use conventional faucet for many tasks. To solve this challenge, specific embodiments of the invention refer to a faucet that includes a control box with all electromechanical controls inside. For the specific example in FIG. 3, the control box can contain three outlet tubes controlled from it. After the hot/cold water is set, water can flow into the control box where it meets the first solenoid diverter. If standard faucet flow is desired, it can proceed into the corresponding tube (e.g., 201 in FIG. 2) and to the faucet's standard downward flow outlet. Otherwise, the water proceeds to the second solenoid diverter. If fountain spray flow is desired, then flow goes into the second tube and to the spray outlet. If fountain flow is desired, it flows into the third tube and then out the fountain flow exit on the faucet. For the spray outlet, different spray patterns can be provided (e.g., flat fan, full cone, hollow cone), droplet size, spray angles, and operating pressures to determine which type the users find most effective. The faucet body can also be designed to incorporate a proximity sensor (e.g., at the base of the front), as well as voice recognition (for example using existing home assistants) to control the faucet through a smart speaker, precisely dispensing water at the desired temperature and volume, with a camera and other sensors to enable hands-free operation. In specific embodiments of the invention, 3D printed parts can be combined with commercial off the shelf (COTS) sensors and standard plumbing components (aerators, flow regulators, etc.) for high reliability.

In specific embodiments of the invention, temperature can be controlled by an electromechanical mixing valve which operates a plunger the same way a mechanical valve does but does not necessarily use a mechanical actuator. Instead, it can use an electrical actuator to move the plunger, and a semiconductor temperature sensor in the outflow to measure the water temperature and balance the flow with a microcontroller. Cold and hot water lines can flow into the water temperature adjustment valve, which can then flow into the control box which can contain three solenoid valves and a battery box. The system can utilize an under-the-sink control box where it will house the power and control electronics. The control box can accept hot and cold-water lines connected to a mixing solenoid valve. That valve can connect to three separate solenoid valves that control the main flow, fountain nozzle, and facial spray nozzle individually. There can be a temperature sensor at the mixing solenoid valve which can interface with the main control circuit. The circuit can be battery-powered and be the main controller for interfacing with the proximity sensor, eye gaze sensor, and provide a user-facing temperature readout. To work with a smart speaker, the control electronics can include wireless technology to receive commands via voice. The control electronics can remain in a low power mode to conserve battery power until activated (e.g., by a proximity sensor or voice control). Battery life for typical lithium-ion batteries in sensor faucets can be 3+ years or 200,000 cycles. The power source can be designed to accommodate AC power through an adaptor kit. Comparable to other existing smart faucets, internet connectivity can be required for voice control.

Figure 3:
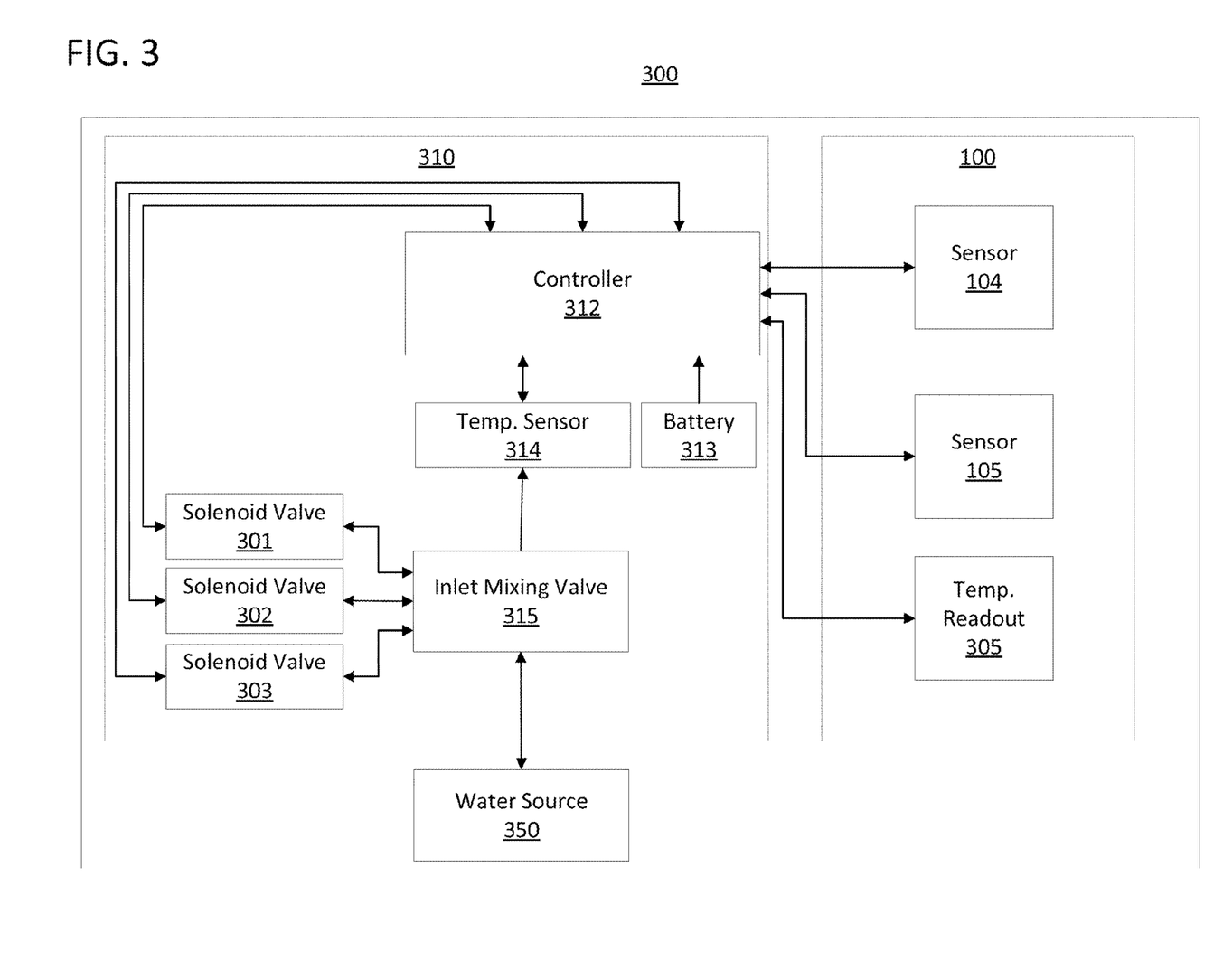
FIG. 3 illustrates a block diagram of exemplary components of a faucet assembly, in accordance with specific embodiments of the invention disclosed herein.

FIG. 3 illustrates a block diagram of exemplary components of a faucet assembly 300, in accordance with specific embodiments of the invention. The faucet assembly can be, or otherwise include, a faucet such as faucet 100 described with reference to FIG. 1 and FIG. 2. The block diagram in FIG. 3 illustrates some of the components that can be included in a faucet such as faucet 100, such as sensors 104 and 105 introduced with reference to FIG. 1.

One of the sensors (e.g., 104 and/or 105) can be a proximity sensor. A proximity sensor can be useful for adjusting an ON/OFF input for users with some higher-level function once the form factor water properties have been set. It can also be useful for turning on the system in general to save sensor power when not in use. The sensor can be an off-the shelf sensor integrated with the faucet such as a standard faucet sensor assembly (e.g., a brand name standard faucet sensor assembly) with adjustable range to enable this sensor input. Additionally, off-the-shelf doppler short range radar sensor modules can be used to detect proximity to the faucet. This kind of sensor can determine whether a person is present in front of the faucet, which can be used as a trigger for the control system to engage any other modules, for example other sensors or means for interacting with a user such as a camera, voice monitoring, etc.

One of the sensors (e.g., 104 and/or 105) can be an eye gaze sensor. Eye gaze is a control mechanism which can be implemented using low-cost sensors. This mechanism could allow various control degrees of freedom (e.g., Up, Down, Left, Right) which could be used in various calibrated patterns to control various functions, such as water outputs. This sensor can be integrated with an eye-tracker system or software (e.g., a brand name eye tracking hardware and accompanying or separate software program). The sensor form factor can be a small, low-profile bar, that typically fits at the bottom of a computer screen.

In specific embodiments of the invention and as illustrated in the example of FIG. 3, the faucet can include additional features such as a temperature read-out module 305. The temperature read-out module 305 can be a temperature indicator, such as an LED temperature indicator. A real-time temperature indication in numerical degrees can be used to accurately and quickly enable a user to confirm proper temperature, and adjust the temperature. In specific embodiments of the invention, temperature can be adjusted from 40 to 120 degrees Fahrenheit (The Environmental Protection Agency (EPA) recommends 120 degrees Fahrenheit to keep diseases at bay, but not cause scalding). Specific embodiments of the invention can use off-the-shelf systems for this purpose, such as the TPiA 4.4T 4146 L3.9 Spatial Array, which can be a low-cost method for assessing temperature in a small form factor.

Although it is not illustrated in FIG. 3, the faucet assembly can also include a voice recognition module in specific embodiments of the invention. Voice commands may be a simple and quick way to adjust faucet controls. Voice commands can be enabled through a microphone on the faucet or faucet assembly generally, or a microphone operating in association with the faucet such as a microphone installed near the faucet, or the microphone of a user device such as a smart phone and/or a laptop. Various software can be used to process the voice, such as any speech-to-text Application Programming Interface (API), which can parse a voice cue for command words. The voice commands can also be provided via any smart speaker or assistant. In specific embodiments of the invention, no new Artificial Intelligence (AI) or Machine Learning (ML) is needed for voice recognition as several companies have readily available trained neural networks to use for transcription task (e.g., available home assistants).

Although it is not illustrated in FIG. 3, the faucet assembly can also include an image capture/processing module, such as a camera, in specific embodiments of the invention. Machine vision and facial recognition strategies can be used to control various characteristics such as water form factor. While this could be a more computationally intensive method, it could provide advantages such as calibration to an individual user in a care facility, as well as autodetection of a task that the user is trying to perform. In such implementations, no explicit control inputs would be needed. For example, if the user opens their mouth for a drink, the system could automatically launch the "drinking" settings. Commercial off-the-shelf camera modules that can be integrated with the rest of the system can be used (e.g., the Arducam OV5642 that integrates directly into an Arduino board).

The faucet assembly can also include a control module 310. The control module can be provided with the faucet itself, or as an associated module, such as an under-the-sink or around-the-sink module that can be installed to operate with the faucet. The one or more processors described before in this disclosure can be part of the control module 310 and work in combination with a memory storing instructions for the processor(s) to perform any of the actions described in this disclosure. The control module can include at least one controller, such as controller 312 in FIG. 3. The controller(s) can be the processor(s) described before in this disclosure. The controller 312 can be the main controller of a Printed Circuit Board assembly (PCBA) where other components can be embedded.

The faucet assembly can include one or more valves, such as valves 301, 302, 303, and 315. The valves can control and/or direct the flow of water from a water source 350 to the various conduits (e.g., 201, 202, 203 introduced with reference to FIG. 2) and on to the corresponding outlets (e.g., 101, 102 and 103 introduced with reference to FIG. 1). Valves 301, 302 and 303 can be provided in a one-to-one correspondence with conduits 201, 202 and 203, respectively. The valves can allow/prevent the flow of water to their respective conduit by blocking/unblocking the conduit. In specific embodiments of the invention, valves 301, 302 and 303 are electromechanical valves (e.g., solenoid valves) that can be controlled and actuated via a signal from a controller, such as controller 312. The controller 312 can be programmed to actuate the valves based on a faucet configuration. For example, the valves can be normally closed valves that are opened for one or more of the conduits when the faucet configuration for a given instance indicates that water should be allowed to flow to the respective one or more water outlets.

In specific embodiments of the invention, an inlet valve, such as valve 315, can be used to control the flow of water from the water source into the faucet. In specific embodiment of the invention, inlet valve 315 can be a mixing valve configured to mix water. For example, valve 315 can be configured to mix water from a hot-water source and a cold-water source to allow water of a set temperature into the conduits. One or more sensors, such as temperature sensor 314, can be used to monitor and control the temperature of the water. The inlet valve can be electrically controlled so that the mixing rate can be updated as the desired temperature is updated (for example if a user desires to change the temperature of the water).

In specific embodiments of the invention, the faucet assembly can be battery operated. The assembly can include one or more batteries, such as battery 313, to store power for the system, which can be used to power the various components such as the sensors and valves. In specific embodiments of the invention, the system can be configured to be connected to a power outlet (the battery may or may not be provided in those embodiments).

In specific embodiments of the invention, water from a water source, such as water source 350, can be routed by a controller to the various conduits/outlets by actuating the respective valves 301, 302 and 303. Water can be routed based on a faucet configuration which can indicate which outlet should be used at a given time. The faucet configurations can be stored in a memory accessible to the controller. The faucet configurations can be default faucet configurations stored in memory by a device manufacturer or downloaded from a library of configurations. For example, the faucet can have configurations stored for various tasks such as washing hands, drinking water, face washing, or others, so that when it is determined that one of those tasks is to be performed (for example by detecting user's gestures/voice commands via the one or more sensors) the faucet can be configured accordingly. The configurations can be stored in association with the task to be performed and define a state of the valves (e.g., open/closed, conduits and/or outlets so that water is allowed to flow through the required path). For example, if it is determined that the user intends to drink water (e.g., by receiving a signal from at least one sensor and/or means for interacting with the user indicating a dedicated user command, a dedicated user gesture, and/or a user's position with respect to the faucet, etc.), a faucet configuration for drinking water can be determined. This configuration can define the outlet to which water should be allowed to flow (e.g., a fountain flow outlet for drinking water). The faucet configuration can include a state for the various valves, for example indicating that the valve that leads to the fountain flow conduit should be open while the others should be closed. In this way, water can be allowed to flow from a water source to one of the different water outlets based on the faucet configuration.

In specific embodiments of the invention, the faucet configurations are trained faucet configurations that can be stored in memory during a training phase for the faucet. The training phase can be performed to train an algorithm, executed by the processor(s), to match signals, or data in the signals from the one or more sensors to desired faucet configurations. The algorithm can be a computer program running on the processor(s). The processor(s) can include a signal processing module (e.g., a single processing software) to obtain relevant data from the signals received from the sensors, and such data can then be used by the computer program or algorithm to match a faucet configuration. The algorithm can be a matching engine configured to receive signals, or data from the signals, as input and match the output with pre-stored trained configurations. The algorithm can be in the form of a series of algorithms (e.g., in the form of a neural network) designed to recognize patterns in the input signals (e.g., sensor signals) and match them with faucet configurations associated to the patterns.

The training phase can be conducted by a user at any given time, for example when the user first installs and/or sets the faucet. The training phase can be conducted using the sensors (e.g., sensors 104 and 105) and the means for interacting with the user. For example, the user can perform a gesture, or give a voice command, that can be captured by the sensors and can be registered to be used as a trigger for a given faucet configuration. The user can set the given configuration (e.g., washing face: warm water via outlet 102) which can then be saved in association with the gesture or other input performed (e.g., the user's face approaching outlet 102, the user looking towards a given direction, the user saying, "washing face", etc.).

The faucet assembly can be configured, in specific embodiments of the invention, to provide guidance throughout the training phase in order to register the user's trained configurations. For example, the faucet assembly can provide auditory cues or prompt texts in a screen that instruct the user to perform a gesture that will indicate that the user intends to wash their face. The user can be prompted also to select a desired water temperature and type of flow (e.g., angle, pressure, laminar or turbulent, etc.). The flow of water can be triggered during the training phase so that the user can be able to adjust it in real time (e.g., feel the temperature of the water and adjust it accordingly). Once the user has finished defining the desired configuration, such configuration can be stored in association with the action performed, so that any time that the user performs the same action, the same configuration is triggered. In specific embodiments of the invention, the algorithm is trained to recognize a signal pattern that triggers the configuration (e.g., if the gesture performed matches a gesture performed during the training phase). In specific embodiments of the invention, the algorithm is trained to match the signal with one of the stored trained configurations (e.g., if the gesture matches one of the gestures performed during the training phase, then match it with the configuration associated to such gesture).

Figure 4:
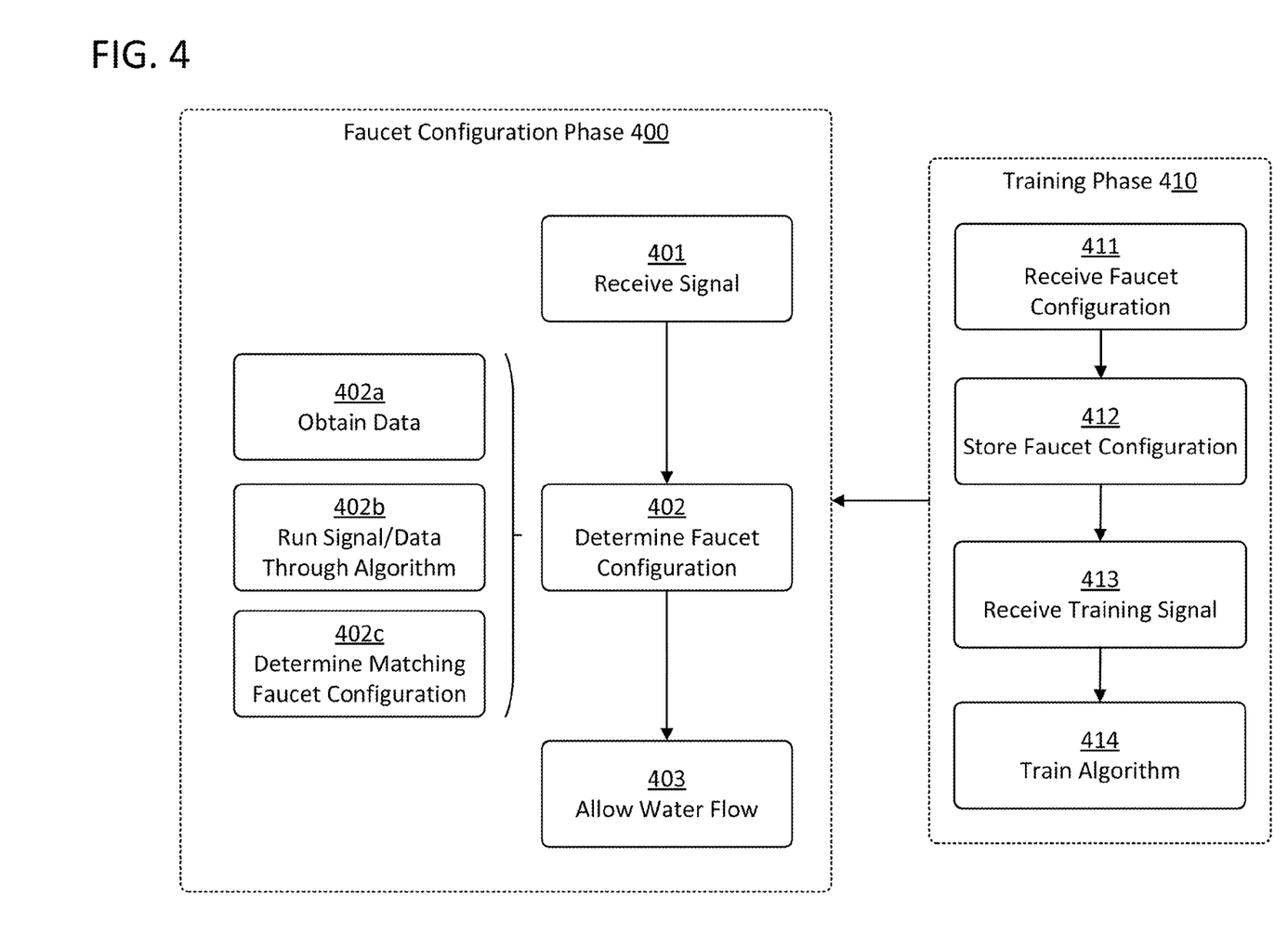
FIG. 4 illustrates a set of flowcharts for a set of methods of training and using/configuring a faucet, in accordance with specific embodiments of the invention disclosed herein.

FIG. 4 illustrates a set of flowcharts for a set of methods of training and using/configuring a faucet, such as the faucet 100 described with reference to FIGS. 1, 2 and 3. Flowchart 400 includes steps for a faucet configuration phase. The faucet configuration phase can be conducted, for example, when a user approaches the faucet to use it. The steps in flowchart 400 can be executed by a processor (e.g., controller 312) executing instruction stored in memory. Flowchart 400 includes a step 401 of receiving one or more signals. The signal(s) can be received by the processor(s) from one or more sensors/means for interacting with the user, located in or around the faucet, such as sensors 104 and 105. Flowchart 400 further includes a step 402 of determining a faucet configuration for the faucet. The faucet configuration can be determined based on the signal(s) received in step 401. Flowchart 400 further includes a step 403 of allowing water to flow from a water source (e.g., 350) to one of the different water outlets (e.g., 101, 102, 103). Water can be allowed to flow in step 403 based on the faucet configuration determined in step 402, and therefore based on the signal received in step 401.

The steps of the method described above can allow a user to approach a faucet and perform any gesture or give any command to the faucet for the user to use the faucet in a desired configuration. The gesture/command can be captured by the one or more sensors and the sensors can signal the processor in step 401. For example, a sensor can detect a user's presence or absence near the faucet and send a signal to the processor in step 401. The signal can then be used by the processor for various purposes, such as for turning other elements of the system on/off. In specific embodiment of the invention, a sensor such as a presence sensor can sense a user presence and send a signal to the processor in step 401. The processor can determine, in step 402, that the faucet configuration should be "on", and therefore turn on or activate other sensors on the faucet that may be in an idle state (e.g., to save battery and/or processing power) to further detect additional signals in more iterations of step 401, before proceeding to step 403 of allowing water to flow. In this way, a first sensor can be used to turn the faucet on/off in a first iteration of step 401 and one or more additional sensors can be used to further capture signals (e.g., indicative of the task that the user will perform such as wash hands) and send them to the processor in further iterations of step 401. A more detailed example of the above can be in instances where the faucet assembly is configured to respond to voice commands from the users. A microphone, voice recognition and processing modules can be off or idle until a user's presence it detected by a sensor in the faucet. The sensor can signal the processor in step 401 to turn those modules on and the user can then proceed to give the voice commands for the faucet configuration. The voice commands can then be sent to the processor in a new iteration of step 401 and the desired faucet configuration can be then determined in step 402, from the voice commands or other signals.

The faucet configurations can be stored in memory, so that the processor can determine the faucet configuration in step 402 by fetching a faucet configuration from memory. For example, various faucet configurations can be stored in memory, such as a faucet configuration for a "washing hands" mode, for eyewash mode, for a "face washing" mode, for a "drinking water" mode, or any other mode. Each of the faucet configurations can include a definition of the outlet to which water should be allowed to flow from the water source. For example, a faucet configuration for a "washing hands" mode can define that water should flow to outlet 101 while a faucet configuration for a "drinking water" mode can define that water should flow to outlet 103. Similarly, the faucet configuration can define other parameters such as water temperature, water form factor, type of flow, etc. For example, a faucet configuration for a "washing hands" mode can define that water should be at a set, warm temperature, while a faucet configuration for a "drinking water" mode can define that water should be at a different set, cold temperature. The previous examples are non-limiting examples of what the water configuration can entail. The specific configurations and/or modes mentioned herein are for explicative purposes only. Any configuration for any given mode, task or desired way to use the faucet can be implemented, and such configurations can include how the water will be provided and/or from which outlet.

The faucet configuration can be stored in memory in association with certain data that can be obtained from the signal, so that the processor can determine the faucet configuration in step 402 by parsing the signal to obtain the data (substep 402a) and fetch the faucet configuration stored in association with the data. For example, the faucet configuration can be stored in memory in association with an identification for the configuration, such as a name (e.g., "washing hands" configuration). The name can be obtained from a voice command received via a microphone and parsed to detect key words that are indicative of the name of the configuration. In this way, the processor can determine a faucet configuration based on the data in the signal. As another example, the faucet configuration can be stored in memory in association with an identification, and such identification can be in turn associated with a gesture or other input that the user may provide. The sensors can capture the gesture/input and the signal from the sensors can be processed by the processor to identify the associated identification/configuration.

In specific embodiments of the invention, the faucet assembly can be configured to undergo a training phase, as indicated by flowchart 410, where the faucet configurations can be set for later use. The steps in flowchart 410 can be performed by one or more processors, such as controller 312. Flowchart 410 starts with a step 411 of receiving a faucet configuration. The faucet configurations can be received in various ways. For example, the faucet configurations can be received via the sensors and means for interacting with the user described before in this disclosure. In specific embodiments of the invention, when the training phase is triggered (e.g., when the faucet assembly is first installed, when a new user is registered as a user of the faucet, etc.) the user can be guided to set the faucet configurations, for example via auditory cues, text and/or images in a display, etc. For example, the faucet can include or work in association with a display/speaker that provide instructions to the user as to how to set the configurations. The configurations can be for default modes provided with the faucet or for personalized modes as customized for the user. For example, the faucet can already include default modes depending on the various features of the faucet. In the example of a faucet such as faucet 100 which includes a standard downward faucet flow outlet 101, a spray outlet 102 and a fountain flow outlet 103, the faucet assembly can provide default modes that imply using specific outlets, for example associated to various tasks that the user can perform using the faucet. In this case, the user can be prompted to set the faucet configuration for a "drinking water" mode, which by default could imply the use of the fountain outlet 103. The user could then set a desired temperature and type of flow (e.g., angle, volume, etc.). In specific embodiments of the invention, the user can be prompted with the various modes that the faucet is configured to operate in, and the user can select the mode and provide the desired configuration, if any, in step 411. The faucet configuration can be stored in memory, as indicated by step 412.

Flowchart 410 continues with a step 413 of receiving a training signal. The training signal can be received by the processor from one or more sensors and/or means for interacting with the user such as sensors 104 and 105. The training signal can be a signal captured by the sensors as part of the training phase. For example, the user can perform certain gestures and/or control commands that can be used to trigger a certain faucet configuration (e.g., any of the faucet configurations stored in step 412). During the training phase, the user can perform the gestures/inputs which can be matched with various modes/faucet configurations by training an algorithm, as indicated by step 414. For example, the user can be guided to perform a gesture of their choice that will trigger any of the modes, such as the "drinking water" mode. The gesture can be either placing the body/face in the position that the user will adopt for drinking water, or looking to a certain direction (e.g., looking right indicates drinking water mode while looking left indicates washing hands mode), or saying a voice command, etc. This training signal can be used to train the algorithm so that whenever a signal with the same or similar pattern is received in the future, the same mode is triggered (e.g., the same configuration is determined). By training the algorithm, the system can "learn" what input the user will use to trigger a desired configuration. Once the system is trained, the configuration method in flowchart 400 can be performed every time the users approach the faucet and perform the gesture/command. The steps in flowchart 410 can be performed in different order since the training signal (in step 413) can be provided before the faucet configuration (in step 411).

In specific embodiments of the invention where the training phase includes training an algorithm, step 402 of determining a faucet configuration can include running the signal received in step 401 (or data obtained in substep 402*a* by for example parsing the signal) through the trained algorithm, as indicated by substep 402*b*. Step 402 can also include a substep 402*c* of determining the faucet configuration that matches the received signal. In this way, when a user desires to use the faucet for a given task/configuration, the user can perform the gesture/command according to the trained gesture/command for that task/configuration, and the algorithm can match the gesture to the faucet configuration stored in association with such gesture.

Training an algorithm to learn the different gestures and/or commands that the user will perform to trigger the different faucet configurations can be advantageous in that the system can be able to recognize the gestures and/or commands every time they are performed and trigger the faucet configuration associated to that gesture. In this way, the user does not need to reconfigure or set the faucet for each use. This can be particularly relevant for individuals with physical disabilities, which can or cannot perform the training phase with the help of another user but then will be able to use the faucet on their own in a daily basis.

Figure 5:
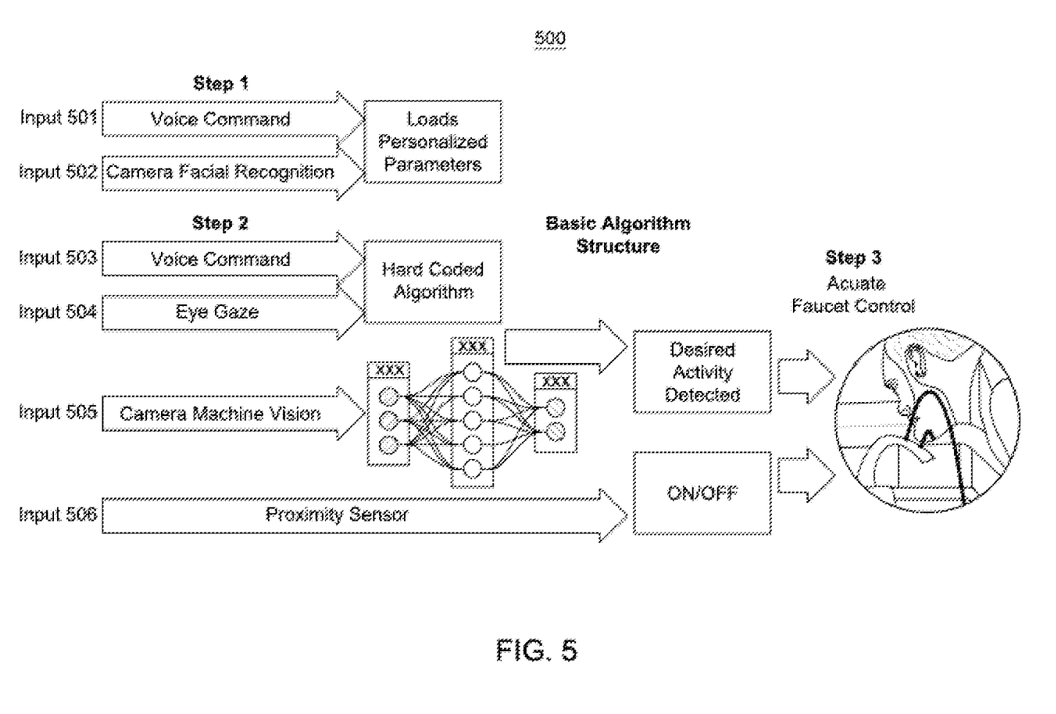
FIG. 5 illustrates a block diagram of a basic algorithm structure, in accordance with specific embodiments of the invention disclosed herein.

Specific embodiments of the invention involve the use of task based intelligent control algorithms, and serve for example for task calibration (e.g., set the faucet configurations) and control system input to output mapping. A first step can involve calibration of the platform (e.g., for an individual user task). This can be completed as part of a manual process (the users themselves and/or in collaboration with their caregiver). The initial calibration can define the water form factor parameters which a user prefers for a given task (e.g., drinking and face washing). In this way, a user can manually determine parameters such as the desired temperature, force/angle, and spray type for a given task. Once determined by manual adjustment, the faucet configurations can be programmed into the system for a given user. In the illustrated example, the user can provide various inputs, such as input 501 (voice command or other input) and input 502 (facial recognition or other input). In this way, the system can identify the user, so that even if various users use the same faucet, the configurations are personalized for each user.

A second step in system setup can be to determine the control degrees of freedom that a given user has available to adjust the system including ON/OFF or toggling through different tasks. Based on the sensors available, the system can ask a user to perform certain tasks such as speak a variety of words including their name and the task names "drinking" and "face washing"; move their eyes in each direction; capture a base video of their face and body in baseline, drinking, and face washing positions; move their face toward the faucet to calibrate proximity distance for ON/OFF; among others. The network can capture each of these for calibration, as well as to ensure that all are available by the user and disregard any signals for inputs that were not able to be calibrated. In specific embodiments of the invention, the system is programmed for performing ADL intention detection and faucet initiation. Artificial intelligence and machine learning algorithms can perform multi-sensor (camera, radar, thermometer, microphone) fusion to determine user proximity, intention, and water temperature which will be used to send control signals to the faucet.

FIG. 5 illustrates a block diagram 500 of a basic algorithm structure, in accordance with specific embodiment of the invention. In specific embodiments of the invention, the control algorithm can involve three steps. In the first step illustrated in FIG. 5, the system can load personalized calibration parameters (e.g., at least part of the faucet configurations) for a given subject. The subject can be recognized via various inputs, such as inputs 501 and 502 (voice recognition, camera facial recognition, or any other input). Multiple sensor modalities can be established for each step in case one is not available for a given subject. Once personalized parameters are known, the next steps can determine which ADL task is being attempted and actuate the faucet.

In the second step illustrated in FIG. 5, a variety of sensors can be evaluated (e.g., voice command as input 503 and eye gaze (or any other input such as gesture and/or facial landmark detection), as input 504 or any other input). In specific embodiments of the invention, the inputs can use a hard corded algorithm. As an example, voice command can be triggered by the subject speaking the name of the ADL, such as "drinking" or "face washing". Variants for common names of the ADL can also be hard coded so that the user does not need to memorize the precise commands stored by the system. Eye gaze can be used with a repetitive up down movement to trigger "drinking," while a repetitive horizontal movement can trigger "face washing." The eye movement and sensor data described herein are for explicative purposes only. Any movement, gesture and/or input can be used for the same purpose and can be set in a training phase for the faucet.

In specific embodiments of the invention, ambient noise can be detected through measurement of background noise and can be characterized through routine time/frequency decomposition techniques (e.g., wavelet, Fourier transform). This profile can then be subtracted from future signals to prevent misclassification. As part of the control algorithm, there can be a baselining period to characterize the background. Specific embodiments of the invention use advanced control input such as machine vision (505) using facial recognition and object detection strategies to automatically determine which ADL the subject is attempting. In this strategy, users do not necessarily need to learn a new input, as they can simply attempt to perform the ADL. Some examples of the technology that can be used for this purpose include fine-tuned pre-trained ResNets (as a foundation for custom Convolutional Neural Network (CNN) event detection), YOLOv3 and EfficientDet for object detection, Mask R-CNN for semantic segmentation, as well as custom genetic algorithm-derived models to ensure proper sequencing of detected stages of movement to indicate a desired ADL. Ground-truth labels for facial landmark recognition can be performed manually to ensure accuracy of the models. In specific embodiments of the invention, the algorithms can be adapted as necessary to achieve >90% accuracy with <250 ms latency.

The final step in FIG. 5 includes the use of a proximity sensor for an input 506 (e.g., as the subject brings their face close to the faucet). Bringing the face to the faucet can trigger the water to turn on in a given form factor, while pulling the face away can trigger it to turn off. A level of hysteresis can be built into the system to avoid a jittery response. For example, the hysteresis can be 500 ms or greater. The AI/ML algorithms can be adapted for gesture recognition, physiologic state detection, and human emotion recognition.

In specific embodiments of the invention, artificial intelligence and machine learning algorithms can be used to perform multi-sensor (camera, radar, thermometer, microphone) fusion for various purposes such as to determine user proximity, intention, and water temperature which can be used to send control signals to the faucet. There are several off the shelf Software Development Kits (SDKs) and other software tools that perform facial landmark detection. This can include eye, mouth, nose, eyebrow detection among several other facial landmarks. Several pre-trained, deep convolutional neural network models (CNNs) are publicly available including YOLOv3, Inception v3, and others (for example recently used models to automatically detect mask wearing in the era of COVID-19) and can function in real time. Specific embodiments of the invention use these pre-trained models to evaluate them for real-time capabilities and accuracy.

In specific embodiments of the invention, the machine learning and artificial intelligence behind the perceptive task can be developed for healthy participants (e.g., video game players) and not adapted for patients that have SCI and likely have additional objects that are in view of the camera (e.g., wheelchair head rests, microphones) and therefore will necessarily need to be tested and likely adapted for the SCI patient population. Furthermore, different models can be considered to take into account variable bathroom/kitchen lighting, and how well they are developed for heterogenous skin tones, facial deformities, or other sources of variability. Various toolboxes and existing code bases can be explored across several different conditions and provide supplemental algorithms (custom CNNs) as needed to adapt landmark detection as needed. Ground-truth labels for facial landmark recognition can be performed manually to ensure accuracy of the models. To accomplish this task, the aforementioned algorithms can be trained and tested against data gathered from ODU in the target patient population. In specific embodiments of the invention, the algorithms can be adapted as necessary to achieve >90% accuracy with <250 ms latency (which can be, in some embodiments, the minimum criteria needed for a functional, real-time system that interacts with humans). Furthermore, the AI/ML algorithms can be adapted for gesture recognition, physiologic state detection, and human emotion recognition.

In specific embodiments of the invention, various types of sensors can be used. For example, the OmniPresense doppler short range radar (OPS241-A-CW-RP) can be used to detect proximity to the faucet. These sensors can be inexpensive, accurate, and have the appropriate form factor for this application. This sensor can determine whether a person is present in front of the faucet, and use it as a trigger for the control system to engage other mechanisms (e.g., the camera, voice monitoring, etc.). In specific embodiments of the invention, no new AI/ML is needed for voice recognition as several companies have readily available trained neural networks to use for transcription task. Specific APIs (for example APIs for the readily available trained networks) can be used. In terms of temperature detection, the TPiA 4.4T 4146 L3.9 Spatial Array can be used in specific embodiments of the invention. This can be a low-cost method for assessing temperature in a small form factor. For voice recognition, a microphone embedded in the faucet assembly, and/or a user device such as a laptop a can be used in specific embodiments of the invention. For video (facial recognition), the commercially available Arducam OV5642 can be used in specific embodiments of the invention, that can integrate directly into an arduino board that can be used in specific embodiment of the invention. In specific embodiments of the invention, the sensors can be routed through an Arduino plugged to external processing such as user device (e.g., laptop). In specific embodiments of the invention, an embedded system to perform the processing can enable a closed solution within the faucet.

Figure 6:
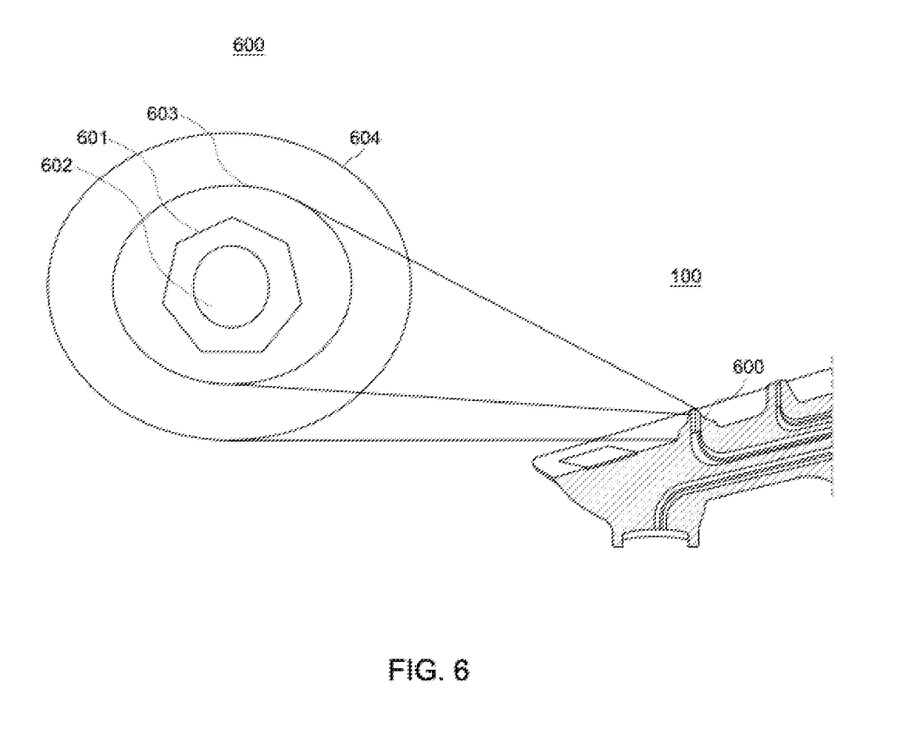
FIG. 6 illustrates a configuration for a nozzle for a faucet, in accordance with specific embodiments of the invention disclosed herein.

FIG. 6 illustrates a configuration for a nozzle, such as a nozzle 600 for any of the outlets of a faucet, such as faucet 100 described with reference to FIGS. 1, 2 and 3. In specific embodiments of the invention, the nozzle can be adapted to receive a tool (such as an Allen wrench, a screwdriver, or any other tool or key) to facilitate installation and removal of the nozzles. Depending on the design, the nozzles, once installed, can be hard to remove. Designing the inside of the top of the nozzle in such a way that it would accommodate a tool can therefore make for easy removal and reinstallation. In the example of FIG. 6, the nozzle is adapted to receive an Allen wrench by including a hexagonally shaped indentation 601 interior to the nozzle. In specific embodiments of the invention, a nozzle could be configured to receive a tool in various other ways such as by including a slot for receiving a flat head screwdriver. In other words, the hexagonally shaped indentation 601 could be replaced by any tool interface so long as it did not alter the water flow hole 602. In alternative embodiments, the tool interface could serve as the water flow hole itself. However, in the illustrated case, the circular water flow hole 602 provides a laminar flow for a fountain of water whereas a hexagonal water flow hole would not. Therefore, as the tool interface in this case is not suited to the desired water flow characteristic, the tool interface and flow hole are aligned but separate, and the outline of the tool interface is larger than the outline of the flow hole. In alternative embodiments, such as when the desired flow characteristic is a fountain spray, the flow hole and tool interface could be the same shape and by configured to receive a flat head screwdriver. The outside diameter 603 can be designed to be as close to the hexagonal shaped indentation 601 as possible.

Providing this kind of structure to the nozzle can be advantageous in that, overtime, users may desire to remove the aerator/flow regulator, for example to clean it due to calcium buildup (as for normal faucet aerators). Cost effective tools such as an Allen wrench can be provided with the faucet so that the user can have it handy for future use. The design concept as illustrated does not affect the water flow hole 602, keeping it the same diameter so that the different water streams are not affected. The area outside of the water flow hole can then be designed to accommodate a hex wrench as illustrated in the figure, without greatly affecting the overall design in shape and/or size. In these approaches, since the outer portion 604 of nozzle 600 will not need to be gripped by a tool for maintenance or removal, it can take on any desired form factor such as a smoothly curved and visually appealing form factor that blends in with the main body of the faucet. Furthermore, the nozzle 600 can retain a chrome, or other scratchable, finish without reduced danger of being marked or damaged during maintenance or removal.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method disclosed herein can be executed by a processor in combination with a computer readable media storing instructions for the methods in combination with the other hardware elements described above. These and other modifications and variations to the present invention may be practiced by those skilled in the art, without departing from the scope of the present invention, which is more particularly set forth in the appended claims.

What is claimed is:

1. A smart faucet assembly comprising:
   a faucet having at least two different water outlets;
   at least one sensor configured to detect at least one user's at least one input indicative of at least one intent and signal that to at least one processor;
   and the at least one processor configured to:
   execute a machine learning algorithm that facilitates personalization of the faucet's response to the user's at least one intent by selecting one or more desired faucet configurations for the user based on signals received from the at least one sensor, a memory, and the machine learning algorithm;
   allow water to flow from a water source to one of the at least two different water outlets in accordance with the one or more desired faucet configuration(s) for the user;
   and adapt over time in matching the at least one intent to the one or more desired faucet configurations of the at least one user by the machine learning algorithm recognizing patterns in the signals received from the at least one sensor;
   wherein the one or more desired faucet configuration(s) comprise a desired outlet selected from the at least two different outlets, and a desired duration, a desired temperature, a desired flow angle, and a desired flow pattern.

2. The smart faucet assembly of claim 1, wherein the faucet configuration defines to which outlet, in the at least two different water outlets, water is allowed to flow from the water source.

3. The smart faucet assembly of claim 1, wherein the at least two different water outlets comprises:
   a standard downward faucet flow outlet;
   and at least one of:
   a fountain flow outlet;
   and a spray outlet.

4. The smart faucet assembly of claim 1, wherein the at least one sensor includes at least one of a proximity sensor, a facial landmark sensor, a microphone, and a camera.

5. The smart faucet assembly of claim 1, wherein the processor is further configured to store at least two faucet configurations in a memory accessible to the processor wherein the faucet configuration for the faucet is one of the at least two faucet configurations.

6. The smart faucet assembly of claim 5, wherein:
   the at least two faucet configurations are stored during a training phase for the faucet.

7. The smart faucet assembly of claim 1, wherein the faucet further comprises:
   a nozzle in at least one of the at least two different water outlets;
   a flow hole in the nozzle;
   a tool interface aligned with the flow hole;
   and wherein an outline of the tool interface is larger than an outline of the flow hole.

8. The smart faucet assembly of claim 7, wherein the tool interface is hexagonally shaped;
   and the flow hole is circular.

9. The smart faucet assembly of claim 1, wherein it further comprises a control module.

10. The smart faucet assembly of claim 9, wherein the at least one processor is placed within the control module.

11. A method of facilitating personalization of a smart faucet's response to a user wherein the method comprises:
    configuring the smart faucet comprising at least one water source, at least two water conduits, at least two different water outlets, at least one sensor, at least one accessible memory, at least one processor, and at least one valve to control flow of water from the outlets in faucet configurations desired by the user by:
    configuring the water conduits, the water outlets, and the at least one valve inside the smart faucet to respond to control commands from the at least one processor;
    configuring the at least one processor to run a machine learning algorithm;
    training the machine learning algorithm with signals from the at least one sensor to detect at least one user's at least one input indicative of at least one intent;
    storing desired faucet configurations learned from the training and preferred by the user in the at least one accessible memory;
    configuring the at least one processor to execute commands that deliver water with desired flow parameters from the at least two water outlets by selecting faucet configurations for the user when the user desires;
    the faucet adapting over time in matching the at least one intent to the one or more desired faucet configurations of the at least one user by the machine learning algorithm recognizing patterns in the signals received from the at least one sensor;
    wherein the one or more desired faucet configuration(s) comprise a desired outlet selected from the at least two different outlets, and a desired duration, a desired temperature, a desired flow angle, and a desired flow pattern.

12. The method of claim 11, wherein the faucet configuration defines to which outlet, in the at least two different water outlets, water is allowed to flow from the water source.

13. The method of claim 11, wherein the at least two different water outlets comprises:
    a standard downward faucet flow outlet;
    and at least one of:
    a fountain flow outlet;
    and a spray outlet.

14. The method of claim 11, wherein the at least one sensor includes at least one of a proximity sensor, an eye gaze sensor and a camera.

15. The method of claim 11, further comprising: storing at least two faucet configurations in a memory; wherein the faucet configuration for the faucet is one of the at least two faucet configurations.

16. The method of claim 15, wherein the at least two faucet configurations are stored during a training phase for the faucet and the training phase includes:
    receiving the faucet configuration;
    storing the faucet configuration as one of the at least two faucet configurations;
    receiving a training signal from the at least one sensor;
    and training the machine learning algorithm, using the training signal and the faucet configuration, to match the signal with the faucet configuration.

17. The method of claim 16, wherein faucet configuration is determined by:
    obtaining data from the signal;
    running the data through the machine learning algorithm;
    and determining, using the machine learning algorithm, the faucet configuration in the at least two faucet configurations that matches the signal.

18. The method of claim 11, wherein the faucet further comprises:
- a nozzle in at least one of the at least two different water outlets;
- a flow hole in the nozzle;
- a tool interface aligned with the flow hole; and
- wherein an outline of the tool interface is larger than an outline of the flow hole.

* * * * *